(12) United States Patent
Sander et al.

(10) Patent No.: US 10,234,545 B2
(45) Date of Patent: Mar. 19, 2019

(54) LIGHT SOURCE MODULE

(75) Inventors: Avner Sander, Hofit (IL); Giora Yahav, Haifa (IL); Asaf Pellman, Rishpon (IL); Shlomo Felzenshtein, Nesher (IL); Eli Larry, Beit She'an (IL); David Mandelboum, Rakefet (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 750 days.

(21) Appl. No.: 12/957,417

(22) Filed: Dec. 1, 2010

(65) Prior Publication Data

US 2012/0140484 A1   Jun. 7, 2012

(51) Int. Cl.
*H05B 33/06* (2006.01)
*G01S 7/484* (2006.01)
*G01S 17/89* (2006.01)

(52) U.S. Cl.
CPC .............. *G01S 7/484* (2013.01); *G01S 17/89* (2013.01)

(58) Field of Classification Search
CPC .. H01S 5/02244; H01S 5/02276; H01S 3/025; F21V 23/001; H01L 33/38; H01L 33/642; H01L 33/62; H01L 24/49
USPC ................. 315/334, 363, 185 R, 189, 185 S; 362/296.1, 311.12, 358, 169, 215, 268, 362/335, 455; 372/29.013, 38.05, 87; 438/25–26, 122, 574, 578–579, 666; 257/431–433, 773–776, 778
See application file for complete search history.

(56) References Cited

U.S. PATENT DOCUMENTS

| | | |
|---|---|---|
| 4,199,703 A | 4/1980 | Samson |
| 4,470,801 A | 9/1984 | Broadt |
| 4,627,620 A | 12/1986 | Yang |
| 4,630,910 A | 12/1986 | Ross et al. |
| 4,645,458 A | 2/1987 | Williams |
| 4,689,797 A | 8/1987 | Olshansky |
| 4,695,953 A | 9/1987 | Blair et al. |
| 4,702,475 A | 10/1987 | Elstein et al. |
| 4,709,370 A | 11/1987 | Bednarz et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |

(Continued)

FOREIGN PATENT DOCUMENTS

| | | |
|---|---|---|
| CN | 1866565 | 11/2006 |
| CN | 1945844 | 4/2007 |

(Continued)

OTHER PUBLICATIONS

"Design Strategies for Stray Inductance Optimized Wire-Bond Power Modules"; Muhlfeld, Ole et al.; Institute of Power Electronics and Electrical Drives, Christian-Albrechts University of Kiel, Germany; Conference PCIM Europe 2010, pp. 244-248.

(Continued)

*Primary Examiner* — Tung X Le
*Assistant Examiner* — Henry Luong

(57) ABSTRACT

An embodiment of the invention provides apparatus for providing light pulses comprising a light source electrically connected to a low inductance configuration of electrodes for electrically connecting the light source to a power supply.

20 Claims, 4 Drawing Sheets

(56) References Cited

U.S. PATENT DOCUMENTS

| | | |
|---|---|---|
| 5,136,152 A | 8/1992 | Lee |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,241,552 A | 8/1993 | Bergmann |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,569,957 A | 10/1996 | McLean |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,808,325 A * | 9/1998 | Webb ............................ 257/99 |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,335,548 B1 * | 1/2002 | Roberts ............. H01L 23/49562 250/239 |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,501,167 B2 | 12/2002 | Hanamura |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,614,056 B1 * | 9/2003 | Tarsa ...................... H01L 33/20 257/773 |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,727,643 B2 | 4/2004 | Suehiro |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,821,128 B2 | 11/2004 | Belopolsky |
| 6,873,723 B1 | 3/2005 | Aucsmith et al. |
| 6,876,496 B2 | 4/2005 | French et al. |
| 6,937,742 B2 | 8/2005 | Roberts et al. |
| 6,941,080 B2 | 9/2005 | Kasper et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,112,885 B2 | 9/2006 | Chen et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |

(56) References Cited

U.S. PATENT DOCUMENTS

| | | | |
|---|---|---|---|
| 7,684,592 B2 | 3/2010 | Paul et al. | |
| 7,690,817 B2* | 4/2010 | Sanpei et al. | 362/294 |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| 7,888,699 B2* | 2/2011 | Oshio | H01L 25/167 257/99 |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,233,512 B2* | 7/2012 | Tamaya et al. | 372/36 |
| 8,362,703 B2* | 1/2013 | Kumar | H05B 33/0824 257/79 |
| 8,610,136 B2 | 12/2013 | Zoorob et al. | |
| 8,888,331 B2 | 11/2014 | Mandelboum et al. | |
| 2002/0101157 A1 | 8/2002 | Suehiro | |
| 2003/0032337 A1 | 2/2003 | Sorensen | |
| 2005/0025202 A1 | 2/2005 | Kagaya et al. | |
| 2006/0249746 A1* | 11/2006 | Oshio | H01L 25/0753 257/99 |
| 2006/0289202 A1 | 12/2006 | Takeuchi et al. | |
| 2008/0026838 A1 | 1/2008 | Dunstan et al. | |
| 2008/0044127 A1 | 2/2008 | Leising et al. | |
| 2008/0073738 A1* | 3/2008 | Chang | H01L 25/167 257/433 |
| 2008/0290353 A1 | 11/2008 | Medendorp et al. | |
| 2009/0236622 A1* | 9/2009 | Nishihara | H01L 33/504 257/98 |
| 2009/0296762 A1 | 12/2009 | Yamaguchi | |
| 2010/0014274 A1* | 1/2010 | Shyu et al. | 362/11 |
| 2010/0117099 A1 | 5/2010 | Leung | |
| 2010/0123161 A1* | 5/2010 | Takeuchi | H01L 33/387 257/99 |
| 2010/0201280 A1 | 8/2010 | Mckenzie et al. | |
| 2011/0114369 A1 | 5/2011 | Lee et al. | |
| 2011/0127569 A1* | 6/2011 | Mineshita | H01L 33/62 257/99 |
| 2011/0188245 A1* | 8/2011 | Chen | 362/235 |
| 2011/0198662 A1 | 8/2011 | Lin et al. | |
| 2011/0201157 A1 | 8/2011 | Lin et al. | |
| 2013/0163627 A1 | 6/2013 | Seurin et al. | |
| 2014/0124822 A1 | 5/2014 | Yan | |
| 2014/0327902 A1 | 11/2014 | Giger et al. | |
| 2017/0238420 A1 | 8/2017 | Mandelboum et al. | |

FOREIGN PATENT DOCUMENTS

| | | |
|---|---|---|
| CN | 201259185 | 6/2009 |
| CN | 101254344 B | 6/2010 |
| DE | 10313399 A1 | 12/2003 |
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Pulsed Laser Diodes; from Osram website, Osram catalog, Product Family Overview, Oct. 30, 2007: http://catalog.osram-os.com/catalogue/catalogue.do?act=showBookmark&favOid=0000000200019007001c0023.

Nanostack Pulsed Laser Diode in Plastic Package, 10W Peak Power; Lead (Pb) Free Product—RoHS Compliant; from Osram website/ catalog:SPL PL85; Mar. 4, 2009, Data Sheet: http://catalog.osram-os.com/catalogue/catalogue.do?favOid=0000000200020fc100070023&act=showBookmark.

PCT International Search Report: PCT/US2012/036385 mailed on Oct. 23, 2012.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shag et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

(56) References Cited

OTHER PUBLICATIONS

Granieri et al., "Simulating Humans in VR", The British Computer Society, Oct. 1994, Academic Press.
Brogan et al., "Dynamically Simulated Characters in Virtual Environments", Sep./Oct. 1998, pp. 2-13, vol. 18, Issue 5, IEEE Computer Graphics and Applications.
Fisher et al., "Virtual Environment Display System", ACM Workshop on Interactive 3D Graphics, Oct. 1986, Chapel Hill, NC.
"Virtual High Anxiety", Tech Update, Aug. 1995, pp. 22.
Sheridan et al., "Virtual Reality Check", Technology Review, Oct. 1993, pp. 22-28, vol. 96, No. 7.
Stevens, "Flights into Virtual Reality Treating Real-World Disorders", The Washington Post, Mar. 27, 1995, Science Psychology, 2 pages.
"Simulation and Training", 1994, Division Incorporated.
Chinese Office Action: 201110409960.X mailed on Dec. 31, 2013.
Chinese Office Action: 201110409960.X mailed on May 21, 2013.
"Notice of Allowance Issued in U.S. Appl. No. 15/044,526", dated Mar. 2, 2018, 11 Pages.
"Fourth Office Action Issued in Chinese Patent Application No. 201110409960.X", dated Jan. 19, 2015, 6 Pages.
"Third Office Action and Search Report Issued in Chinese Patent Application No. 201110409960.X", dated Jul. 17, 2014, 12 Pages.
"International Search Report and Written Opinion Issued in PCT Application No. PCT/US2017/017080", dated May 16, 2017, 11 Pages.
Xie, et al., "Optimization of Thermal Management Techniques for Low Cost Optoelectronic Packages", In IEEE 4th Electronics Packaging Technology Conference, Dec. 10, 2002, 5 Pages.

\* cited by examiner

LIGHT SOURCE MODULE

TECHNICAL FIELD

Embodiments of the invention relate to illumination systems that provide short pulses of light.

BACKGROUND

Illumination systems configured to produce a train of light pulses that are repeated at high frequency are used as stroboscopic, fast photography lamps for studying ultrafast processes in physics, chemistry, and biology and for light sources in time of flight (TOF) cameras, conventionally referred to as TOF three dimensional (3D) cameras, that provide distance measurements to features in a scene that they image.

Time of flight (TOF) three-dimensional (3D) cameras determine distances to features in a scene by acquiring an image, conventionally referred to as a "range image", of the scene that can be processed to determine how long it takes light to travel from the camera to the features and back to the camera. The round trip flight times of the light to, and back from the features, and the speed of light are used to determine the distances to the imaged features.

To acquire a suitable range image that can be processed to determine the times of flight, a light source transmits a train of short duration pulses of light to illuminate the scene. Following a predetermined delay after transmittal of each light pulse in the light pulse train, the camera is shuttered open for a short exposure period. Light from the light pulse that is reflected by features in the scene, and that reaches the camera during the exposure period, is imaged by the camera on pixels of the camera's photosensor. An amount of light from all the light pulses in the train that is registered by a given pixel is used to determine a round trip time of flight for light, to and back from, a feature imaged on the given pixel, and therefrom a distance to the feature.

Light pulses in a light pulse train that are transmitted by a light source to illuminate a scene imaged by a TOF 3D camera and exposure periods of the TOF 3D camera may have durations of a few nanoseconds and repetition frequencies greater than a megahertz (MHz). Furthermore, amounts of light that features in the scene reflect from the transmitted light pulses are generally limited. As a result, reflected light available from a feature imaged on a pixel may not be sufficient to determine a distance to the feature having an acceptable signal to noise ratio (SNR).

Compensating for factors that limit light available for acquiring an acceptable range image by increasing light intensity provided by the light source is generally both technically and cost-wise challenging. Cost considerations and heat dissipation requirements for maintaining the light source, and camera, at an acceptable operating temperature usually limit intensity of illumination provided by the light source. The fast switching demands mandated by the high repetition rates that may exceed a megahertz (MHz) of light pulses provided by the light source and a common demand that electronic and optical components of systems have small footprints compound the challenges. A footprint of an electronic component conventionally refers to a size of an area of a circuit board that the component occupies. If a volume that a circuit occupies is a relevant characteristic for consideration, a volume occupied by a component may be understood to be the component's footprint.

SUMMARY

An embodiment of the invention provides an illumination system comprising a light source, which is mounted to a low inductance configuration of electrodes for connecting the light source to a power source and is packaged with optics that shape light from the light source in a package having a small footprint. The low inductance connections contribute to efficient use by the light source of energy available from a power supply that powers the light source. The low inductance connections also operate to moderate transient voltage swings that may accompany switching on and switching off the light source at high frequencies to produce short light pulses at a high repetition frequency.

In an embodiment of the invention, the light source and electrode configuration are potted in a transparent casting so that short extensions of the electrode suitable for connecting the diode to control circuitry protrude from the casting. The casting is made having a mating part for mating with, and optically coupling to a matching mating part of another optical or mechanical component. Optionally, the mating part is shaped for insertion into a matching mating part in a first end of a lens tube having a second end designed to receive and seat at least one optical element, such as a lens and/or a diffuser for configuring light from the light source, and/or a protective window. The casting, lens tube, and at least one optical element are assembled to provide a low inductance illumination system, characterized by efficient energy use and heat dissipation, and having a relatively small footprint.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

Figure 1:
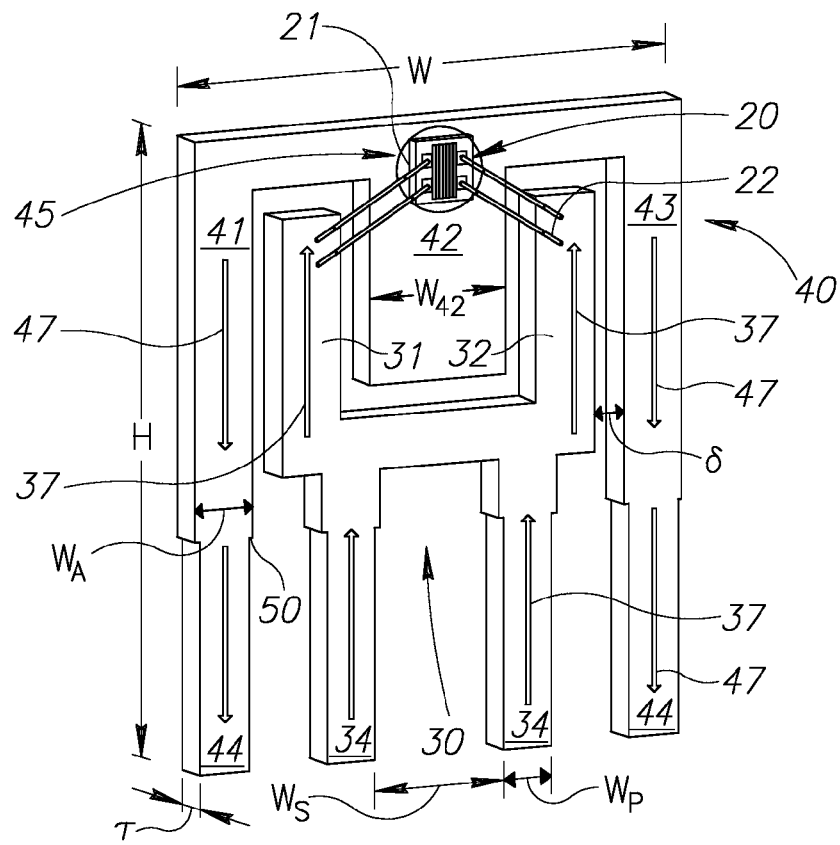
FIG. 1 schematically shows a light source attached to low inductance electrodes in accordance with an embodiment of the invention.
Figure 2:
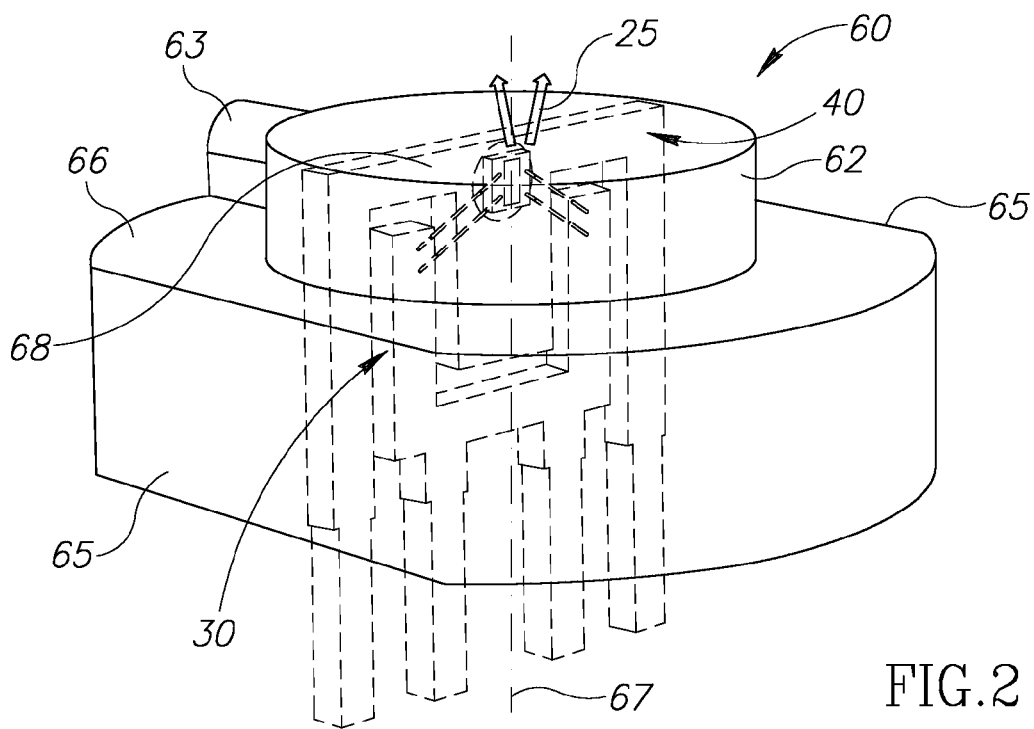
FIG. 2 schematically shows the electrodes and light source shown in FIG. 1 potted in a casting produced from a transparent material in accordance with an embodiment of the invention.
Figure 3:
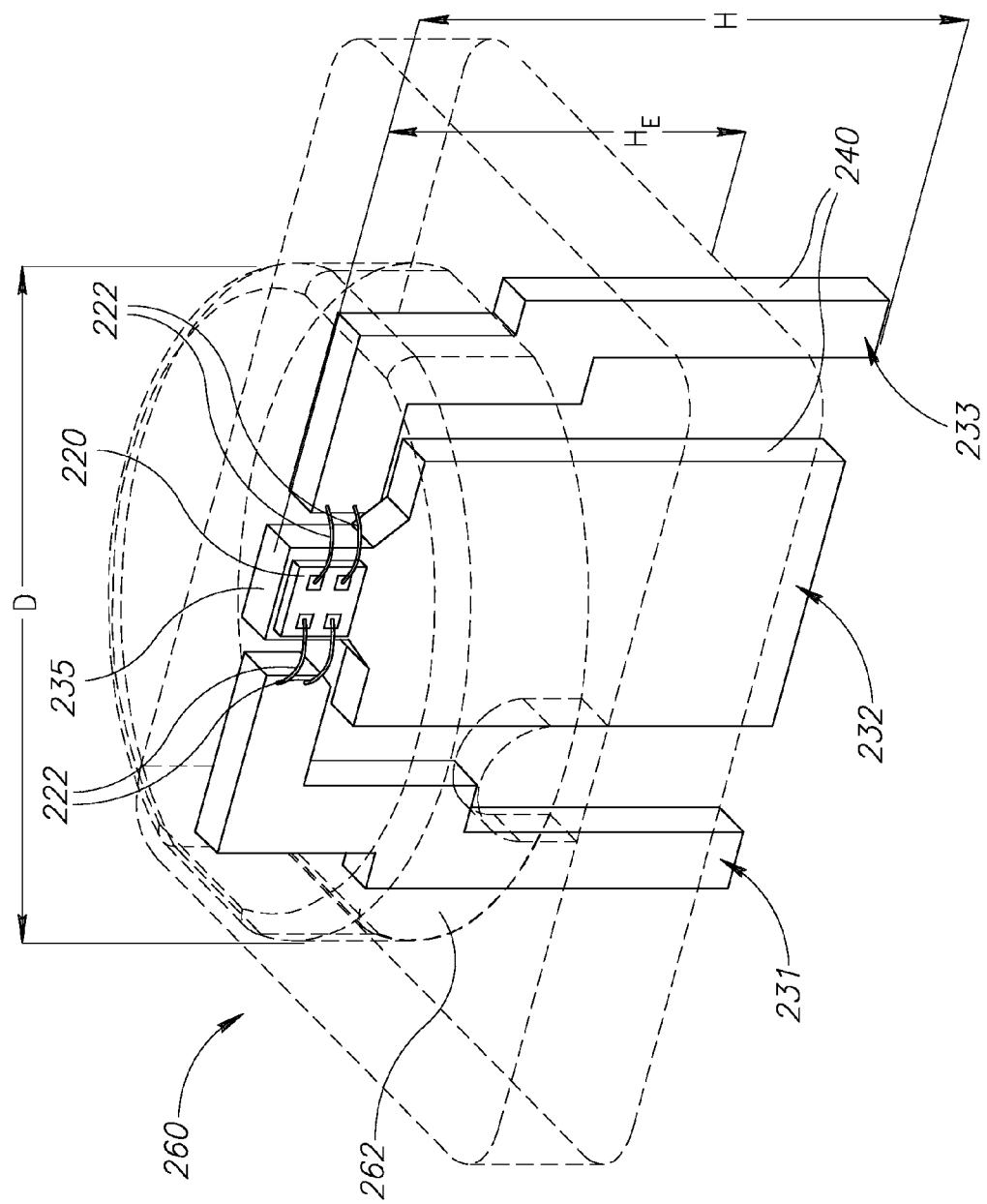
FIG. 3 schematically shows a light source connected to another configuration of electrodes embedded in a casting in accordance with an embodiment of the invention.
Figures 4A, 4B:
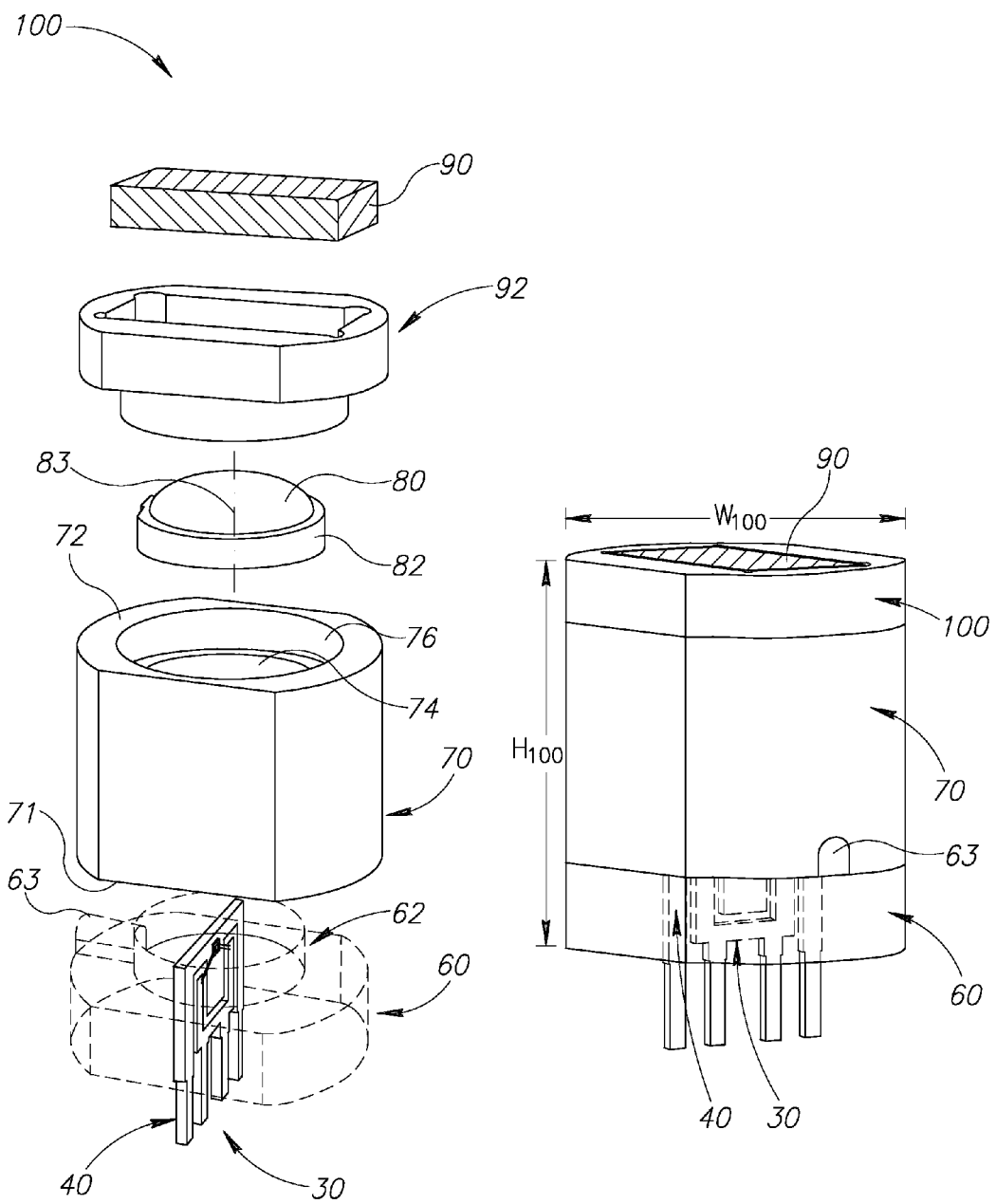
FIGS. 4A and 4B schematically show exploded and assembled views of a light source in accordance with an embodiment of the invention.

The figures attached hereto that are listed in the preceding section illustrate components of a small footprint, low inductance and energy efficient illumination system and their assembly to provide the illumination system, in accordance with an embodiment of the invention. FIG. 1 schematically shows a light source, optionally an edge-emitter diode laser, mounted to a low inductance configuration of electrodes for connecting the light source to a power supply. Attributes of the electrode configuration, and an example of the configuration providing numerical values for its features are discussed in the text. FIG. 2 schematically shows the electrodes and light source shown in FIG. 1 embedded in a casting designed to couple the light source, optionally to optical elements that shape light emitted by the light source to illuminate a field of view (FOV) of a TOF 3D camera. FIG. 3 schematically shows another light source connected to a configuration of electrodes embedded in a casting, in accordance with an embodiment of the invention. FIGS. 4A and 4B schematically show exploded and assembled views respectively of an illumination system comprising the casting and embedded light source shown in FIG. 2, in accordance with an embodiment of the invention. Operation of an illumination system in accordance with an embodiment of the invention is described with reference to FIG. 5, which schematically shows the illumination system connected to a circuit that controls the illumination system to generate a train of light pulses.

FIG. 1 schematically shows a light source 20, mounted to first and second electrodes 30 and 40 for connecting the light source directly or indirectly to first and second power terminals (not shown) respectively of a power supply, in accordance with an embodiment of the invention. Light source 20 may comprise, by way of example, a laser diode, vertical cavity surface emitting laser (VCSEL), and/or an edge emitting laser, operable to provide short light pulses at a high repetition rate for use in a TOF 3D camera. By way of example, in FIG. 1 light source 20 is assumed to be an edge emitter diode laser light source. The light source is electrically connected to second electrode 40 by bonding a cathode (not shown) located on a backside 21 of the diode laser to a region 45 of the second electrode. Optionally a conducting epoxy such as a silver epoxy is used to bond the diode laser cathode to region 45. In some embodiments, the diode laser is soldered to region 45. Bondwire leads 22 electrically connect an anode (not shown) of the diode laser to first electrode 30

First and second electrodes 30 and 40 are formed in accordance with an embodiment of the invention having closely spaced, relatively short, and wide, interleaved conducting elements. The conducting elements are electrically connected to light source 20 so that current from a power supply (see FIG. 5) that powers light source 20 flows into the light source along conducting elements in first electrode 30 that are adjacent and advantageously parallel to conducting elements of second electrode 40 along which current flows out of the light source. Arrows 37 and 47 respectively indicate directions of current flow in elements of electrodes 30 and 40. Electrodes 30 and 40 and location of light source 20 are configured so that bondwire leads 22 are relatively short.

Optionally, first and second electrodes 30 and 40 are configured as "inner" and "outer" electrodes respectively, with inner, first electrode 30 comprising two conducting arms 31 and 32 that interleave with three conducting arms 41, 42 and 43 of outer, second electrode 40. The conducting arms are planar and relatively wide and short. "Width" refers to a dimension substantially perpendicular to current flow in the arms, and "short" refers to a dimension of length substantially parallel to direction of current flow. Middle arm 42 is wide relative to arms 41 and 43 to provide a suitable platform for mounting light source 20 and to enhance its ability to serve as a heat sink for heat generated by light source 20 during its operation. Inner electrode 30 optionally comprises two short and wide mounting pins 34. Similarly, outer electrode 40 optionally comprises two short and wide mounting pins 44. In an embodiment, mounting pins 34 and 44 are configured to be inserted into sockets or holes in a printed circuit board (PCB) to facilitate mounting the electrodes to the circuit board and making electrical contact with conductors in the circuit board that are electrically connected to a power supply that powers light source 20. Each mounting pin optionally has a pair of shoulders 50 that limit a depth to which the pin can be inserted into a PCB socket or hole. Electrical contacts between conductors 30 and 40 and conductors connected to the power supply are advantageously made close to, or at shoulders 50.

Inductance of a conductor generally decreases linearly with its length, and as the log of the inverse of its width. Inductance of a circuit configured having parallel conductors carrying current in opposite directions decreases as a distance between the conductors decreases. Configuring electrodes 30 and 40 in accordance with an embodiment of the invention so that relatively short and wide conductors are closely spaced and interleaved, and adjacent conductors carry current in opposite directions, provides a relatively low inductance electrical connection of light source 20 to a power supply.

Connecting the power supply to light source 20 using low inductance electrodes is advantageous for generating light pulses at a high repetition frequency, and generally provides for improved efficiency of use of energy available from the power supply. Inductance in coupling electrodes that electrically connect a power supply to a light source contributes to limiting how fast the light source can be turned on and turned off, and as a result, how short light pulses provided by the light source can be made, and how fast they can be repeated. Inductance in a fast switching circuit for producing short duration light pulses at a high repetition rate can also produce transient voltages in the circuit that are potentially damaging to the circuit. And inductance is prone to generate undesirable phase differences between voltage and current provided to the light source that reduce efficiency with which the power supply couples energy into the light source. Providing low inductance electrodes for coupling the light source to the power supply tends to moderate potentially performance-limiting effects of inductance.

By way of numerical example, in an embodiment of the invention, electrodes 30 and 40 are optionally made from a sheet of a metal or a metal alloy, such as copper plated with nickel, palladium or gold having thickness, $\tau$, less than or equal to 1 mm (millimeter). Optionally, the thickness of the sheet metal is less than or equal to about 0.5 mm. In an embodiment $\tau$ is less than or equal to about 0.4 mm. Optionally, the interleaved configuration of the electrodes has an overall width, W, less than or equal to about 10 mm, and overall height, H, less than or equal to about 10 mm. Optionally, W and H are respectively less than or equal to about 7.5 mm. The configuration does not of course require than W and H are equal. In an embodiment of the invention, W is equal to about 5 mm and H is equal to about 6 mm.

Bondwire leads 22 in an embodiment of the invention have length less than or equal to about 1.5 mm. Optionally, the bondwire leads have a length less than or equal to about 1 mm. In an embodiment of the invention, the bondwire leads have a length less than or equal to about 0.5 mm. Arms 41, 43, 31 and 32 optionally have widths $W_A$ greater than or equal to about 0.5 mm. Optionally, $w_A$ greater than or equal to about 0.65 mm. In an embodiment of the invention, $W_A$ is greater than or equal to about 0.8 mm. In some embodiments of the invention, the arms have a ratio $W_A/\tau$ that is greater than 1.25. Optionally, the ratio is greater than or equal to about 2. In some embodiments, the ratio is greater than about 3.

In an embodiment of the invention, middle arm 42 has a width $W_{42}$ greater than or equal to about 2.5 mm. Optionally, $W_{42}$ is greater than or equal to about 3 mm. In an embodiment of the invention, $W_{42}$ is greater than or equal to about 3.5 mm. In an embodiment of the invention, arms 41, 43, 31 and 32 have lengths, in a direction of current flow, that is less than or equal to about 7.5 mm. Optionally, the lengths are less than 5.5 mm. In some embodiments of the invention, the lengths are less than or equal to about 3.5 mm.

In an embodiment of the invention, spacing, $\delta$, between adjacent arms of electrodes 30 and 40 is less than or equal to about 0.7 mm. Optionally, $\delta$ is less than or equal to about 0.5 mm. In some embodiments of the invention, $\delta$ is less than or equal to about 0.3 mm.

Spacing, $\delta$, between adjacent arms of electrodes 30 and 40 may be constrained to be greater than a minimum distance, for which minimum distance a process used to produce the electrodes provides an acceptable confidence level that adjacent arms in the electrodes are electrically isolated from each other. For example, in an embodiment of the invention, electrodes 30 and 40 may be laser cut from a metal or metal alloy sheet. To provide an acceptable confidence level for electrical isolation between adjacent arms, the laser cutting may require that a minimum distance $\delta$ between adjacent arms, for example arms 32 and 43, be equal to or greater than about three-quarters of the thickness $\tau$ of the sheet metal. For the value of $\tau$ given above, $\delta$ is equal to about 0.3 mm.

Whereas electrodes 30 and 40 are shown separate and electrically disconnected in FIG. 1 and figures that follow, optionally, when they are produced, such as by laser cutting, they are connected. After they are mounted to a structure that supports them, such as by being embedded in a casting as shown in FIG. 2, the electrodes are separated. For example, electrodes 30 and 40 may be formed joined along portions of their mounting pins 34 and 44 to facilitate handling and embedding in a casting. After embedding, the joined portions of the mounting pins are cut away to separate and electrically disconnect electrodes 30 and 40.

Spacing $W_S$ between pins 34 of inner electrode 30 and spacing between a pin 34 and an adjacent pin 44 of outer electrode 40 is optionally determined by spacing between traces on a printed circuit board (PCB) to which the electrodes are connected to provide power to light source 20. Optionally, pins 34 are spaced apart by a distance $W_S$ less than or equal to about 3 mm, and the pins and pins 44 optionally have a width $W_P$ greater than or equal to about 0.5 mm. In an embodiment of the invention, pins 34 are spaced apart by a distance $W_S$ less than or equal to about 2 mm. In an embodiment of the invention, pins 34 and 44 have widths $W_P$ greater than or equal to about 0.75 mm. A distance between adjacent pins 34 and 44 is optionally less than or equal to about 0.5 mm. In an embodiment of the invention, distances between adjacent pins is about equal to 0.3 mm. In an embodiment of the invention, pins 34 and 44 have a length from shoulders 50 to end that is less than or equal to about 3 mm. In an embodiment of the invention the pins have a shoulder to end length less than or equal to about 2.5 mm.

Electrodes 30 and 40 having dimensions $\tau=0.4$ mm, W=5 mm, H=12 mm, length of arms 41 and 43 about equal to 7.5 mm, $W_A=0.55$ mm, and $\delta=0.3$ mm, present an inductance equal to about 2.8 nH (nanoHenrys) to a circuit that controls light source 20 to emit light pulses. The inductance that characterizes electrodes 30 and 40 for the above noted dimensions is less than conventional configurations of electrodes, which are typically characterized by inductances equal to or greater than about 4 nH.

In an embodiment of the invention, light source 20 and electrodes 30 and 40 are embedded in a casting 60 schematically shown in FIG. 2, made from a material transparent to light produced by semiconductor light source so that pins 34 and 44 protrude from the casting. By way of example, in an embodiment of the invention, light source 20 generates light in an IR (infrared) wavelength band between about 700 nm (nanometers) and about 1200 nm and casting 60 is produced from an epoxy transparent to light in the IR band. Any of various suitable epoxies known in the art, such as epoxies used for optical semiconductor packaging, may be used to provide casting 60.

Casting 60 is optionally formed comprising at least one mating part designed to match a corresponding mating part in a component to which it is intended to be connected. By way of example, casting 60 is formed having a circularly cylindrical mating part 62 and a key mating part 63. Circularly cylindrical mating part 62 extends from a casting base 64 optionally having a shape of a circular cylinder faceted to form two parallel, mirror image planar surfaces 65. Key mating part 63 optionally has a form of an elongate stem extending from the cylindrical mating part in a direction perpendicular to the surface of outer electrode 40 onto which light source 20 is bonded. The cylindrical mating part is shaped to seat in a matching socket of the component to which it is to be connected. The key mating part is shaped to seat in a corresponding slot of the component so that the casting and the component are aligned and cannot rotate relative to each other about an axis 67 of cylindrical matching part 62. Faceting the shape of casting 60 contributes to reducing a footprint of the casting and optionally the component to which it is coupled which may also exhibit matching facets as shown by way of example in FIG. 4B.

Light, represented by block arrows 25, from light source 20 exits casting 60 in a cone shaped beam from a top surface region 68 of cylindrical mating part 62. Numeral 25 used to label the block arrows is also used to refer to light from light source 20 that exits casting 60. The cone in which light 25 propagates usually does not have a circular cross section but typically exhibits an elongated, generally elliptical-like cross section. By preventing rotation of casting 60 about axis 67 relative to a component to which the casting is coupled, key mating part 63 maintains alignment of the "elliptical" cross section with features of the component. In an illumination system comprising casting 60 and embedded light source 20 in accordance with an embodiment of the invention discussed below, key mating part 63 functions to maintain alignment of the elliptical cross section with optical components that shape light 25.

Embedding light source 20 and electrodes 30 and 40 into casting 60 is accomplished by mounting the electrodes as an insert in a mold (not shown) formed having a cavity that is a negative relief of casting 60. Introducing the material from which casting 60 is made into the mold cavity in liquid form so that it fills the cavity and flows to surround the electrodes and light source 20, embeds the light source and electrodes in the casting. Advantageously, the mold is formed having a parting line so that any flash line on the casting that might result from the casting process does not interfere with propagation of light 25 from light source 20 out of the casting. A parting line is a line along which two parts of a mold meet and close together to form a cavity into which a liquid material is introduced and solidified to form a casting.

If the parts of the mold do not close together tightly enough along the parting line, a small seam forms at the parting line. A quantity of the liquid material introduced into the cavity to form the casting flows into the seam and hardens producing a relief copy of the parting line seam on the casting. The relief copy of the seam is referred to as a flash or a flash line. Optionally, a surface region of the mold that forms a region of surface 68 through which light 25 exits the casting is polished to a minor finish.

FIG. 3 schematically shows a light source 220, mounted to electrodes 231, 232, and 233 for connecting the light source directly or indirectly to power terminals (not shown) of a power supply, in accordance with another embodiment of the invention. The electrodes are shown embedded in a casting 260.

Electrode 232 is a central electrode interleaved with, and sandwiched between outer, optionally mirror image electrodes 231 and 233. Central electrode 232 is a relatively large electrode that functions as a heat sink and comprises a "cap" 235 to which light source 220 is mounted. Portions 240 of the electrodes that protrude out from casting 260 function as mounting pins. Electrodes 231, 232, and 233 are connected to conductors electrically connected to a power supply that powers light source 220, such as power traces on a PCB, optionally close to where the electrodes exit casting 260.

In an embodiment of the invention, bondwire leads 222 connect light source 220 to outer electrodes 231 and 233 have lengths less than or equal to about 0.75 mm. Optionally, the leads are less than 0.5 mm. In some embodiments of the invention, bondwire leads 222 have length less than or equal to about 0.4 mm. Electrodes 231, 232 and 233 have a simple elegant configuration that is conducive to their having relatively short lengths and thereby low inductances. In an embodiment of the invention, an overall height H of the casting and electrodes is less than or equal to about 5 mm. A length of the embedded portions of the electrodes is less than or equal to about 2.5 mm. A turret 262 portion of casting 260 has a diameter equal to or less than 5.5 mm.

A casting, such as casting 60 or casting 260, in accordance with an embodiment of the invention is optionally comprised as a component in an illumination system. By way of example, casting 60 is schematically shown comprised in an illumination system 100 shown in an exploded view in FIG. 4A and assembled in FIG. 4B, in accordance with an embodiment of the invention.

Illumination system 100 optionally comprises a lens tube 70 formed from a metal, such as aluminum, or high impact plastic, such as a polystyrene or polystyrene copolymer, that receives casting 60 and comprises optical elements that shape light provided by light source 20 in accordance with an embodiment of the invention. Optionally, the optical elements comprise a collimating lens 80 mounted to or formed with an optionally circular holding frame 82, and an optionally rectangular diffuser 90 that seats in a diffuser mount 92 having a circularly cylindrical mating part 93. In an embodiment of the invention, collimating lens 80 and diffuser 90 shape light 25 from light source 20 so that the light is configured to illuminate a FOV of a 3D TOF camera.

Casting 60 is coupled to lens tube 70 by seating cylindrical mating part 62 and key mating part 63 of the casting in matching recesses (not shown) formed in a first end 71 of lens tube 70. Optionally, the seated mating parts are bonded to surface regions of the recesses using a suitable bonding material such as an epoxy or UV glue. Collimating lens holding frame 82 seats in a socket 74 formed in lens tube 70. The lens tube receives cylindrical mating part 93 of diffuser mount 92 in a socket 76 formed in a second end 72 of lens tube 70. Optionally, when diffuser mount 92 mating part 93 is inserted into socket 76 it the mating part presses on lens frame 82 and locks the lens frame in its socket 74. In an embodiment of the invention, diffuser mount 92 is shaped so that when it is mounted to lens tube 70, the long dimension of rectangular diffuser 90 is parallel to a long dimension of the, optionally elliptical cross section, noted in the discussion of FIG. 2, of light 25 that exits light source 20. Optionally, the diffuser mount is formed having a male or female mating part (not shown) that matches and seats in a corresponding female or male mating part in the lens tube to provide and maintain alignment of the diffuser.

Collimating lens 80 and light source 20 are positioned in lens tube 70 so that light 25 (FIG. 2) illuminates the lens from an aperture of the light source located substantially at a focal region of the lens. The lens collimates the light it receives from the light source into a beam of light parallel to an optical axis 83 of the lens, which passes through an aperture (not shown) in diffuser mount 92 and illuminates diffuser 90. The diffuser diffuses the light so that it propagates away from the illumination system, optionally in a pyramid shaped light cone schematically shown in FIG. 5 and discussed below.

A relatively small footprint characterizes an illumination system, such as illumination system 100, in accordance with an embodiment of the invention. By way of a numerical example, in an embodiment of the invention, illumination system 100 has a height, $H_{100}$, less than or equal to about 20 mm. Optionally, $H_{100}$ is less than or equal to about 15 mm. In some embodiments of the invention, the length $H_{100}$ is equal to or less than 12 mm. A maximum width, $W_{100}$, of the illumination system is less than or equal to about 15 mm. Optionally, $W_{100}$ is less than or equal to about 12 mm. In some embodiments of the invention, $W_{100}$ is equal to or less than 9 mm.

Figure 5:
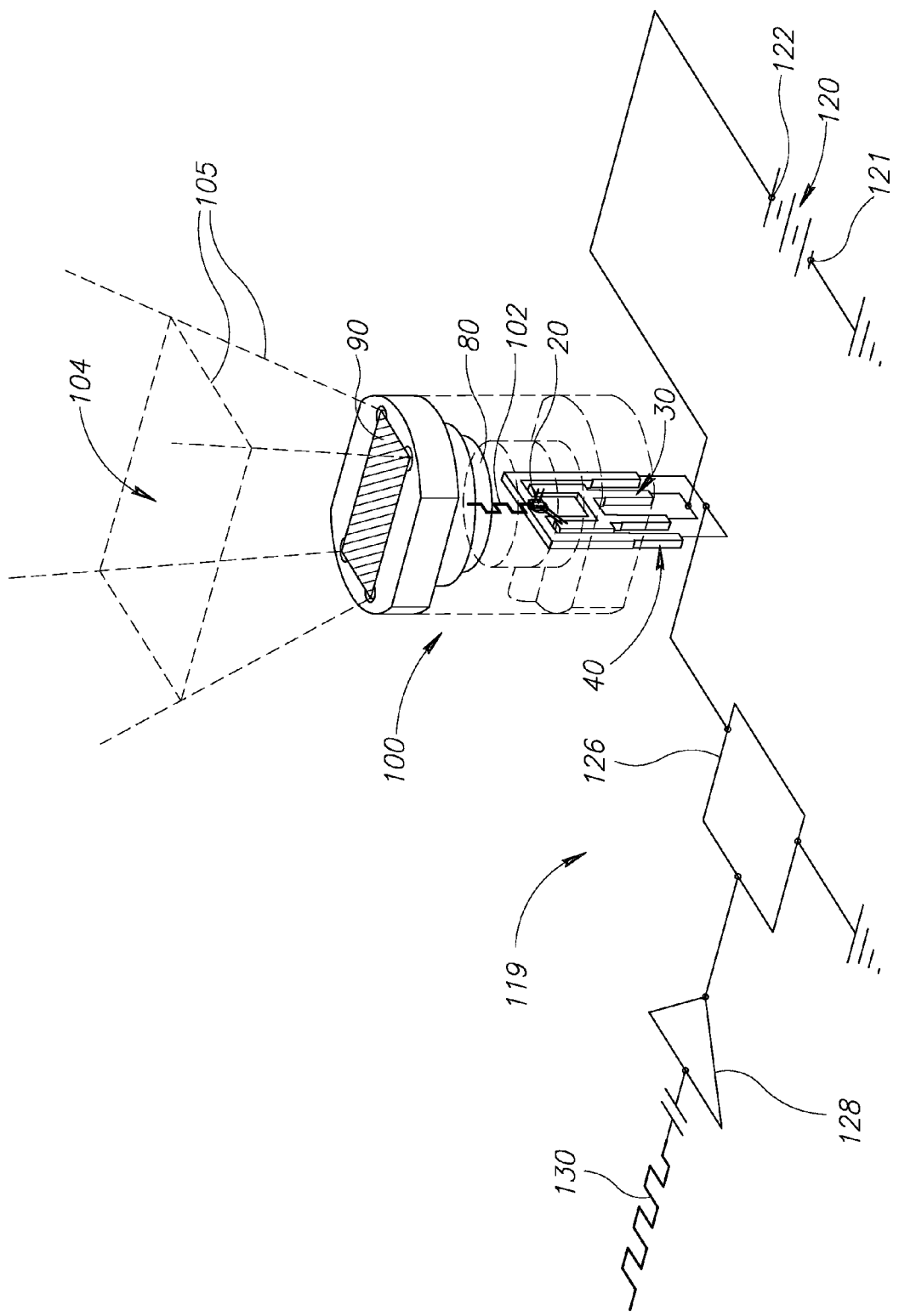
FIG. 5 shows a schematic of a circuit for driving a light source similar to that shown in FIGS. 4A and 4B, in accordance with an embodiment of the invention.

FIG. 5 schematically shows illumination system 100 coupled to a circuit 119 that powers the illumination system and controls it to transmit a train of light pulses 102 characterized by pulses having pulse widths "$P_W$" and a repetition frequency "ν", in accordance with an embodiment of the invention. The pulses propagate in a pyramid shaped light cone 104 schematically represented by dashed lines 105, in accordance with an embodiment of the invention.

Circuit 119 comprises a power supply 120 having a first, negative terminal 121 connected to ground and a second, positive terminal 122 connected to inner electrode 30. Outer electrode 40 is connected to a switch 126. A driver 128 selectively controls the switch to connect the second electrode to ground or disconnect it from ground. When switch 126 connects outer electrode 40 to ground, current flows from power supply 120 through light source 20 and the light source emits light. Current ceases to flow through light source 20 and the light source stops emitting light when switch 126 disconnects outer electrode 40 from ground. Switch 126 is a switch characterized by rise and fall times that are short relative to pulse width $P_W$, and has resistance and inductance that are relatively small in comparison to resistance and inductance contributed to circuit 119 by light source 20 and electrodes 30 and 40.

Driver 128 optionally controls switch 126 responsive to an input signal schematically represented by a pulse train 130 repeatedly to turn on and turn off, and thereby to connect outer electrode 40 to ground for periods having duration $P_W$ at a repetition frequency ν. As a result, illumination system 100 transmits light pulses 102 having pulse width substantially equal to $P_W$ at a repetition frequency ν. In an embodiment of the invention, as by way of example given below, intensity I, light pulse width $P_W$, and transmission repetition frequency ν are suitable to provide light pulses for acquiring a range image of the scene by a TOF 3D camera.

In an embodiment of the invention, $P_W$ is less than or equal to about 20 ns. Optionally, $P_W$ is less than or equal to about 15 ns. In some embodiments of the invention, $P_W$ is about equal to 5 ns. Optionally, repetition frequency ν is equal to or greater than 250 kHz. In some embodiments of the invention ν is greater than or equal to about 1 MHz. Optionally, the repetition frequency is greater than or equal to about 5 MHz.

By way of an example of an embodiment of the invention suitable for use in a TOF 3D camera, light source 20 is an edge emitting laser, optionally a laser marketed by OSRAM Opto Semiconductors Inc. having catalogue number SPL-PL85-3 that provides light pulses at an IR wavelength equal to about 850 nm (nanometers). Switch 126 may be a metal-oxide-semiconductor field-effect transistor (MOSFET) such as a MOSFET marketed by Fairchild Semiconductor Corporation under the catalogue number FDMS8692. Switch FDMS8692 has a resistance less than or equal to about 10 mΩ (milliohms), an inductance less than or equal to about 0.5 nH (nanohenry). The switch is characterized by a switching speed between on and off (conducting and non-conducting) states having rise and fall times respectively that are less than about 3 ns (nanoseconds). Optionally, switch 126 is turned on and turned off by pulse train 130 to control the SPL-PL85-3 laser to produce light pulses having pulse width $P_W$ equal to about 15 ns and repetition frequency ν equal to about 0.5 MHZ.

For use in a TOF 3D camera, light pulses 102 may have a peak power of about 10 watts and for the 15 ns pulse width and 0.5 MHZ repetition frequency, provide optical power at about 75 mW (millwatts). Assuming that illumination system 100 has an inductance equal to 2.8 nH referred to above, power supply 120 provides the illumination system with about 220 mW of electrical power. An efficiency with which the illumination system transduces electrical power into optical power is therefore about 34%. In accordance with an embodiment of the invention for which illumination system 100 has an inductance equal to about 2 nH, power supply 120 provides the illumination system with about 210 mW, for a conversion efficiency of the illumination system equal to about 36%.

A conventional illumination system having inductance equal to about 4 nH and producing the same light pulses at the same repetition frequency generally exhibits an efficiency for converting electrical to optical energy less than about 27%. A configuration of electrodes in accordance with an embodiment of the invention, such as that exhibited by electrodes 30 and 40 therefore provides an improvement in energy conversion between about 26% to about 33%.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. An apparatus for providing light pulses, the apparatus comprising:
   a configuration of coplanar electrodes comprising at least one first electrode configured to form a recess and a second electrode that is a heat sink at least a portion of which seats in the recess ; and
   a light source mounted to and electrically connected to the at least a portion of the second electrode that seats in the recess and electrically connected to the at least one first electrode so that current that powers the light source flows parallel to a same first direction in each of the at least one first electrode and flows in a second direction substantially anti-parallel to the first direction in the second electrode.

2. The apparatus according to claim 1 wherein the electrodes and the electrical connections between the light source and the electrodes present an inductance to a circuit that powers the light source that is less than or equal to 3 nH (nanohenrys).

3. The apparatus according to claim 2 wherein the inductance is less than or equal to 2.8 nH.

4. The apparatus according to claim 3 wherein the inductance is less than or equal to 2.0 nH.

5. The apparatus according to claim 1 wherein the light source is connected to the at least one first electrode by at least one bondwire lead having length less than or equal to about 1.5 mm.

6. The apparatus according to claim 5 wherein the at least one bondwire lead length is less than or equal to about 0.5 mm.

7. The apparatus according to claim 1 wherein the at least one first electrode comprises a single first electrode having a U shaped portion comprising two parallel arms connected by a third arm that forms the recess.

8. The apparatus according to claim 7 wherein the second electrode is a substantially "E" shaped electrode having three arms extending from a same side of a common backbone, wherein the middle arm of the substantially E shaped electrode seats in the recess and is bracketed by the parallel arms of the single first electrode.

9. The apparatus according to claim 8 wherein the middle arm of the substantially E shaped electrode and the parallel arms of the U shaped electrode have lengths along directions that are less than or equal to 7.5 mm.

10. The apparatus according to claim 9 wherein the lengths are less than or equal to 3.5 mm.

11. The apparatus according to claim 8 wherein the middle arm of the substantially E shaped electrode and the parallel arms of the U shaped portion of the second electrode have widths larger than their respective thickness.

12. The apparatus according to claim 11 wherein a width of at least one of the middle arm of the substantially E shaped electrode and the parallel arms of the U shaped electrode portion of the second electrode has a ratio of width divided by thickness that is greater than or equal to about 1.25.

13. The apparatus according to claim 12 wherein the ratio is greater than or equal to about 2.

14. The apparatus according to claim 11 wherein at least one of the middle arm of the substantially E shaped electrode and the parallel arms of the U shaped portion of the second electrode has a width greater than or equal to about 0.5 mm.

15. The apparatus according to claim 14 wherein the width is greater than or equal to about 0.8 mm.

16. The apparatus according to claim 8 wherein a distance between the middle arm and a parallel arm of the two parallel arms is less than or equal to about 0.5 mm.

17. The apparatus according to claim 1 and comprising a casting in which the electrodes and light source are embedded.

18. The apparatus according to claim 17 wherein the electrodes comprise conducting pins that extend from the casting.

19. The apparatus according to claim 17 wherein the casting comprises at least one mating part configured to mate with a corresponding mating part of a component to which the casting is coupled.

20. The apparatus according to claim 1 wherein the at least one first electrode comprises two first electrodes, each having a relatively long leg and a short foot extending from the leg and wherein the feet of the two first electrodes face each other so that the first electrodes form the recess and wherein the second electrode comprises a portion seated between the feet and to which the light source is mounted.

* * * * *